US012002361B2

(12) United States Patent
Cheng et al.

(10) Patent No.: US 12,002,361 B2
(45) Date of Patent: Jun. 4, 2024

(54) LOCALIZED ARTIFICIAL INTELLIGENCE FOR INTELLIGENT ROAD INFRASTRUCTURE

(71) Applicant: CAVH LLC, Fitchburg, WI (US)

(72) Inventors: Yang Cheng, Middleton, WI (US); Bin Ran, Fitchburg, WI (US); Shen Li, Madison, WI (US); Shuoxuan Dong, Madison, WI (US); Tianyi Chen, Madison, WI (US); Yuan Zheng, Madison, WI (US); Xiaotian Li, Madison, WI (US); Zhen Zhang, Madison, WI (US); Yang Zhou, Madison, WI (US)

(73) Assignee: CAVH LLC, Fitchburg, WI (US)

( * ) Notice: Subject to any disclaimer, the term of this patent is extended or adjusted under 35 U.S.C. 154(b) by 466 days.

(21) Appl. No.: 16/917,997

(22) Filed: Jul. 1, 2020

(65) Prior Publication Data

US 2021/0005085 A1 Jan. 7, 2021

Related U.S. Application Data

(60) Provisional application No. 62/870,575, filed on Jul. 3, 2019.

(51) Int. Cl.
*G08G 1/16* (2006.01)
*G08G 1/01* (2006.01)
*G08G 1/0967* (2006.01)

(52) U.S. Cl.
CPC ........... *G08G 1/164* (2013.01); *G08G 1/0116* (2013.01); *G08G 1/0141* (2013.01); *G08G 1/096783* (2013.01); *G08G 1/165* (2013.01); *G08G 1/166* (2013.01)

(58) Field of Classification Search
CPC .... G08G 1/164; G08G 1/0116; G08G 1/0141; G08G 1/165; G08G 1/166
See application file for complete search history.

(56) References Cited

U.S. PATENT DOCUMENTS

| | | | | |
|---|---|---|---|---|
| 9,940,840 | B1 * | 4/2018 | Schubert | G06Q 30/06 |
| 9,964,948 | B2 * | 5/2018 | Ullrich | B60W 30/18 |
| 10,074,223 | B2 * | 9/2018 | Newman | G07C 9/00309 |
| 10,380,886 | B2 | 8/2019 | Ran et al. | |

(Continued)

FOREIGN PATENT DOCUMENTS

| | | |
|---|---|---|
| WO | WO2019/156955 | 8/2019 |
| WO | WO2019/156956 | 8/2019 |

(Continued)

OTHER PUBLICATIONS

Beni et al. Swarm Intelligence in Cellular Robotic Systems. Proceed. NATO Advanced Workshop on Robots and Biological Systems, Tuscany, Italy, Jun. 26-30, 1993. pp. 703-712.

(Continued)

*Primary Examiner* — Luis A Martinez Borrero
(74) *Attorney, Agent, or Firm* — Casimir Jones, S.C.; Thomas A. Isenbarger; Thomas J. Lyneis

(57) ABSTRACT

Provided herein is technology relating to connected and automated highway systems and particularly, but not exclusively, to systems and methods for providing localized self-evolving artificial intelligence for intelligent road infrastructure systems.

20 Claims, 7 Drawing Sheets
(6 of 7 Drawing Sheet(s) Filed in Color)

(56) References Cited

U.S. PATENT DOCUMENTS 10,593,198 B2 * 3/2020 Benhammou .......... G08G 1/065
10,674,332 B2 * 6/2020 Mineiro Ramos de Azevedo ...... H04W 4/46
10,692,365 B2 * 6/2020 Ran .................. G08G 1/096725
10,867,512 B2 * 12/2020 Ran ........................ G08G 1/167
11,003,184 B2 * 5/2021 Magalhães de Matos ................. H04W 4/40
11,138,349 B2 * 10/2021 Mizuta .................... G06F 30/20
11,430,328 B2 * 8/2022 Ran ...................... G08G 1/0116
11,449,072 B2 * 9/2022 Martin ............... G01C 21/3415
11,747,806 B1 * 9/2023 Wootton ......... B60W 30/18154 701/28
11,842,642 B2 * 12/2023 Ran ........................ G08G 1/164
11,854,391 B2 * 12/2023 Ran ..................... B60W 30/165
11,881,101 B2 * 1/2024 Ran ........................ G08G 1/167
2003/0225668 A1 * 12/2003 Goto ...................... G06Q 30/06 705/37
2006/0181433 A1 * 8/2006 Wolterman ............ G08G 1/164 340/905
2010/0070253 A1 * 3/2010 Hirata .................. G08G 1/0104 703/8
2011/0205086 A1 * 8/2011 Lamprecht ............... G08G 1/08 340/928
2013/0041642 A1 * 2/2013 Tsuburaya ........... G08G 1/0104 703/2
2016/0097648 A1 * 4/2016 Hannah ................ G08G 1/0116 701/118
2016/0238703 A1 * 8/2016 Liu ......................... G01S 13/88
2017/0026893 A1 * 1/2017 Lagassey .................. G01S 3/80
2017/0053529 A1 * 2/2017 Yokoyama ........... G08G 1/0145
2017/0085632 A1 * 3/2017 Cardote .............. H04L 67/1001
2017/0161410 A1 * 6/2017 Mizuta .................... G06F 30/20
2017/0324817 A1 * 11/2017 Oliveira .................. H04L 67/10
2017/0339224 A1 * 11/2017 Condeixa .............. H04W 4/029
2018/0114079 A1 * 4/2018 Myers .................... G06N 3/044
2018/0151064 A1 * 5/2018 Xu ....................... G08G 1/0116
2018/0158327 A1 * 6/2018 Gärtner .................... G08G 1/04
2018/0174449 A1 * 6/2018 Nguyen ................. G08G 1/015
2018/0182239 A1 * 6/2018 Baverstock ...... G08G 1/096716
2018/0190111 A1 * 7/2018 Green .................. G08G 1/0133
2018/0190116 A1 * 7/2018 Bauer .................. G08G 1/0116
2018/0262887 A1 * 9/2018 Futaki ................... H04W 48/20
2018/0279183 A1 * 9/2018 Song ..................... H04W 36/08
2018/0299274 A1 * 10/2018 Moghe ............... G01C 21/3896
2018/0308344 A1 * 10/2018 Ravindranath ...... G08B 27/001
2018/0317067 A1 * 11/2018 Ameixieira ............. H04W 4/50
2018/0336780 A1 * 11/2018 Ran ...................... G08G 1/0112
2018/0338001 A1 * 11/2018 Pereira Cabral ...... H04L 67/141
2018/0373268 A1 * 12/2018 Antunes Marques Esteves .......... H04W 4/023
2018/0375939 A1 * 12/2018 Magalhães de Matos ................. H04L 41/12
2018/0376305 A1 * 12/2018 Ramalho de Oliveira ................. H04W 4/44
2018/0376306 A1 * 12/2018 Ramalho de Oliveira ................. G08G 1/0112
2018/0376357 A1 * 12/2018 Tavares Coutinho ...................... H04W 64/003
2019/0026796 A1 * 1/2019 Dinis da Silva de Carvalho ........ G06Q 50/40
2019/0051158 A1 * 2/2019 Felip Leon .............. G08G 1/22
2019/0066409 A1 * 2/2019 Moreira da Mota ....................... G07C 5/0808
2019/0068434 A1 * 2/2019 Moreira da Mota ... H04L 41/40
2019/0079659 A1 * 3/2019 Adenwala ............. H04W 4/026
2019/0096238 A1 * 3/2019 Ran ........................ G08G 1/164
2019/0132709 A1 * 5/2019 Graefe ................... G05D 1/028
2019/0137285 A1 * 5/2019 Bailey .................... G11C 5/147
2019/0171208 A1 * 6/2019 Magalhães de Matos ................. G05D 1/0022
2019/0174276 A1 * 6/2019 Mineiro Ramos de Azevedo ...... H04W 4/44
2019/0205115 A1 * 7/2019 Gomes .................... H04W 4/44
2019/0238436 A1 * 8/2019 Volos ...................... H04L 67/12
2019/0244518 A1 * 8/2019 Cheng .............. G08G 1/096725
2019/0244521 A1 * 8/2019 Ran .................. G08G 1/096775
2019/0265059 A1 * 8/2019 Warnick ................. G08G 1/095
2019/0310100 A1 * 10/2019 Yang .................. G01C 21/3461
2019/0316919 A1 * 10/2019 Keshavamurthy .......................... G08G 1/096844
2019/0339709 A1 * 11/2019 Tay ...................... G05D 1/0088
2019/0347931 A1 * 11/2019 Ding ...................... G08G 1/164
2019/0392712 A1 * 12/2019 Ran ...................... G08G 1/0116
2020/0005633 A1 1/2020 Jin et al.
2020/0020227 A1 * 1/2020 Ran ........................ G08G 1/075
2020/0023846 A1 * 1/2020 Husain .................... H04W 4/44
2020/0120444 A1 * 4/2020 Banach ................... G01S 19/42
2020/0168081 A1 * 5/2020 Ran ........................ G08G 1/167
2020/0200563 A1 * 6/2020 Martin ................. G08G 1/0112
2020/0201353 A1 * 6/2020 Martin ............... G01C 21/3697
2020/0202706 A1 * 6/2020 Chaves .................. G08G 1/166
2020/0202711 A1 * 6/2020 Martin ............... G01C 21/3641
2020/0211376 A1 * 7/2020 Roka .................. G01C 21/3492
2020/0216064 A1 * 7/2020 du Toit .................. G06N 20/00
2020/0239031 A1 * 7/2020 Ran ........................ G08G 1/017
2020/0242930 A1 * 7/2020 Ran .......................... G08G 1/22
2020/0284883 A1 * 9/2020 Ferreira ................ G01S 7/4816
2020/0294394 A1 * 9/2020 Guo ................. G08G 1/096783
2020/0312142 A1 * 10/2020 Su ........................ G05D 1/0285
2020/0336541 A1 * 10/2020 Naderi Alizadeh ..... H04L 67/01
2020/0365015 A1 * 11/2020 Nguyen ............... G08G 1/0129
2021/0001857 A1 * 1/2021 Nishitani ............... G06N 3/045
2021/0078598 A1 * 3/2021 Kim ....................... G06V 40/10
2021/0097854 A1 * 4/2021 Guim Bernat ....... G08G 1/0141
2021/0118294 A1 * 4/2021 Ran ........................ G08G 1/167
2021/0122392 A1 * 4/2021 Berger ............... G01C 21/3453
2021/0287459 A1 * 9/2021 Cella .................... G07C 5/0808
2021/0311491 A1 * 10/2021 Li ........................ G08G 1/0116
2021/0394797 A1 * 12/2021 Ran ................... B60W 60/0027
2022/0073104 A1 * 3/2022 Lee .......................... G06N 3/02
2022/0111858 A1 * 4/2022 Ran ..................... B60W 60/001
2022/0114885 A1 * 4/2022 Ran ....................... B60W 40/04
2022/0126864 A1 * 4/2022 Moustafa ............ B60W 30/182
2022/0171400 A1 * 6/2022 Chen .................... G08G 1/0145
2022/0219731 A1 * 7/2022 Ran ...................... G06V 20/597
2022/0258729 A1 * 8/2022 Kim ........................ H04W 4/40
2022/0270476 A1 * 8/2022 Ran ......................... H04W 4/44
2022/0281484 A1 * 9/2022 Ran ..................... B60W 40/105
2022/0332337 A1 * 10/2022 Ran ..................... B60W 60/001
2022/0375335 A1 * 11/2022 Ran .................. G08G 1/096741
2022/0375337 A1 * 11/2022 Ran .................. G08G 1/096811
2024/0005779 A1 * 1/2024 Ran ...................... G08G 1/0145

FOREIGN PATENT DOCUMENTS

WO WO2019/199815 10/2019
WO WO2019/217545 11/2019
WO WO2020/006161 1/2020

OTHER PUBLICATIONS

"Taxonomy and Definitions for Terms Related to On-Road Motor Vehicle Automated Driving Systems." SAE International. Jan. 2014. https://www.sae.org/standards/content/j3016_201401/.

* cited by examiner

LOCALIZED ARTIFICIAL INTELLIGENCE FOR INTELLIGENT ROAD INFRASTRUCTURE

This application claims priority to U.S. provisional patent application Ser. No. 62/870,575, filed Jul. 3, 2019, which is incorporated herein by reference in its entirety.

FIELD

Provided herein is technology relating to connected and automated highway systems and particularly, but not exclusively, to systems and methods for providing localized self-evolving artificial intelligence for intelligent road infrastructure systems.

BACKGROUND

Autonomous vehicles, which can sense their environment, detect objects, and navigate without human involvement, are in development. However, managing multiple vehicles and traffic patterns presents challenges. For example, existing autonomous vehicle technologies require expensive, complicated, and energy inefficient on-board systems, use of multiple sensing systems, and rely mostly on vehicle sensors for vehicle control. Accordingly, implementation of automated vehicle systems is a substantial challenge.

SUMMARY

Provided herein are technologies related to managing traffic using artificial intelligence (AI). In some embodiments, AI is provided as part of an Intelligent Road Infrastructure System (IRIS) (e.g., in a Roadside Unit (RSU)) configured to facilitate automated vehicle operations and control for connected automated vehicle highway (CAVH) systems. In some embodiments, the technology provides methods incorporating machine learning models for localization, e.g., for precisely locating vehicles; detecting objects on a road; detecting objects on a roadside; detecting and/or predicting behavior of vehicles (e.g., motorized and non-motorized vehicles), animals, pedestrians, and other objects; collecting traffic information and/or predicting traffic; and/or providing proactive and/or reactive safety measures.

Accordingly, in some embodiments the technology provides an artificial intelligence (AI) system for automated vehicle control and traffic operations comprising a database of accumulated historical data comprising background, vehicle, traffic, object, and/or environmental data for a localized area; sensors configured to provide real-time data comprising background, vehicle, traffic, object, and/or environmental data for said localized area; and a computation component that compares said real-time data and said accumulated historical data to provide sensing, behavior predict and management, decision making, and vehicle control for an intelligent road infrastructure system. In some embodiments, the computation component is configured to implement a self-evolving algorithm. In some embodiments, the localized area comprises a coverage area served by a roadside unit (RSU). In some embodiments, the system is embedded in an RSU or a group of RSUs. In some embodiments, the system comprises an interface for communicating with other IRIS components, smart cities, and/or other smart infrastructure.

In some embodiments, the system is configured to determine vehicle location. In some embodiments, the system is configured to determine vehicle location using passive localization methods comprising storing a location of an RSU in a storage component of said RSU; and providing said location to a vehicle onboard unit (OBU) located in the coverage area of said RSU. In some embodiments, passive localization methods further comprise calculating vehicle location using vehicle sensor information. In some embodiments, the vehicle sensor information is provided by a vehicle for which vehicle location is being determined. In some embodiments, a vehicle for which vehicle location is being determined comprises an OBU that requests said location information from an RSU. In some embodiments, the system is configured to determine vehicle location using active localization methods comprising calculating a vehicle location for a vehicle and sending said vehicle location to said vehicle. In some embodiments, an RSU calculates said vehicle location and sends said location to said vehicle. In some embodiments, the vehicle is within the coverage area of said RSU.

In some embodiments, the system comprises reference points for determining vehicle location. In some embodiments, the reference points are vehicle reference points provided on vehicles, roadside reference points provided on a roadside, and/or road reference points provided on a road. In some embodiments, the vehicle reference points are onboard tags, radio frequency identification devices (RFID), or visual markers. In some embodiments, the visual markers are provided on the top of vehicles. In some embodiments, each visual marker of said visual markers comprises a pattern identifying a vehicle comprising said visual marker. In some embodiments, the visual markers comprise lights. In some embodiments, the roadside reference points are fixed structures whose locations are broadcast to vehicles. In some embodiments, the fixed structures have a height taller than the snow line. In some embodiments, the fixed structures are reflective. In some embodiments, the fixed structures comprise RSUs. In some embodiments, RSUs transmit the location of the fixed structures to vehicles. In some embodiments, roadside reference points comprise lights and/or markers whose locations are broadcast to vehicles. In some embodiments, fixed structures have an accurately known location. In some embodiments, road reference points are underground magnetic markers and/or markers provided on the pavement. In some embodiments, the system comprises reflective fixed structures to assist vehicles to determine their locations. In some embodiments, the reflective fixed structures have a height above the snow line.

In some embodiments, the system further comprises a component to provide map services. In some embodiments, the map services provide high-resolution maps of an RSU coverage area provided by an RSU. In some embodiments, the high-resolution maps are updated using real-time data provided by said RSU and describing the RSU coverage area; and/or using historical data describing said RSU coverage area. In some embodiments, the high-resolution maps provide real-time locations of vehicles, objects, pedestrians.

In some embodiments, the system is further configured to identify high-risk locations. In some embodiments, an RSU is configured to identify high-risk locations. In some embodiments, a high-risk location comprises an animal, a pedestrian, an accident, unsafe pavement, and/or adverse weather. In some embodiments, an RSU communicates high-risk location information to vehicles and/or to other RSUs.

In some embodiments, the system is configured to sense the environment and road in real time to acquire environmental and/or road data. In some embodiments, the system is configured to record the environmental and/or road data. In some embodiments, the system is configured to analyze the environmental and/or road data. In some embodiments, the system is configured to compare the environmental and/or road data with historical environmental and/or road data stored in a historical database. In some embodiments, the system is configured to perform machine learning using the environmental and/or road data and the historical environmental and/or road data stored in said historical database to improve models and/or algorithms for identifying vehicles and objects and predicting vehicle and object movements. In some embodiments, the system comprises an RSU configured to sense the environment and road in real time to acquire environmental and/or road data; to record the environmental and/or road data; to compare the environmental and/or road data with historical environmental and/or road data stored in a historical database; and/or to perform machine learning using the environmental and/or road data and the historical environmental and/or road data stored in the historical database to improve models and/or algorithms for identifying vehicles and objects and predicting vehicle and object movements in the RSU coverage area of said RSU. In some embodiments, the system is configured to predict road and environmental conditions using the database of accumulated historical data; the real-time data; and/or real-time background, vehicle, traffic, object, and/or environmental data detected by vehicle sensors. In some embodiments, the system predicts road drag coefficient, road surface conditions, road gradient angle, and/or movement of objects and/or obstacles in a road. In some embodiments, the system predicts pedestrian movements, traffic accidents, weather, natural hazards, and/or communication malfunctions.

In some embodiments, the system is configured to detect objects on a road. In some embodiments, the objects are vehicles and/or road hazards. In some embodiments, vehicles are cars, buses, trucks, and/or bicycles. In some embodiments, road hazards are rocks, debris, and/or potholes.

In some embodiments, the system comprises sensors providing image data, RADAR data, and/or LIDAR data; vehicle identification devices; and/or satellites.

In some embodiments, the system is configured to perform methods for identifying objects on a road, said methods comprising collecting real-time road and environmental data; transmitting the real-time road and environmental data to an information center; comparing the real-time road and environmental data to historical road and environmental data provided by a historical database; and identifying an object on a road. In some embodiments, the method further comprises sharing the real-time road and environmental data and/or the historical road and environmental data with a cloud platform component. In some embodiments, the method further comprises pre-processing the real-time road and environmental data by an RSU comprising the RSU sensors. In some embodiments, the pre-processing comprises using computer vision.

In some embodiments, the system is configured to detect objects on a roadside. In some embodiments, the objects are static and/or moving objects. In some embodiments, the objects are pedestrians, animals, bicycles, and/or obstacles. In some embodiments, the system comprises sensors providing image data, RADAR data, and/or LIDAR data; vehicle identification devices; and/or satellites. In some embodiments, the system is configured to perform methods for identifying objects on a roadside, the methods comprising collecting real-time roadside and environmental data; transmitting the real-time roadside and environmental data to an information center; comparing the real-time roadside and environmental data to historical roadside and environmental data provided by a historical database; and identifying an object on a roadside. In some embodiments, the method comprises sharing said real-time roadside and environmental data and/or said historical road and environmental data with a cloud platform component. In some embodiments, the system method comprises pre-processing the real-time road and environmental data by an RSU comprising said RSU sensors.

In some embodiments, the real-time road and environmental data is provided by an RSU. In some embodiments, the real-time roadside and environmental data is provided by an RSU.

In some embodiments, the system is configured to predict object behavior. In some embodiments, object behavior is one or more of object location, velocity, and/or acceleration. In some embodiments, the object is on a road. In some embodiments, the is a vehicle or bicycle. In some embodiments, the object in on a roadside. In some embodiments, the object is a pedestrian or abnormally moving roadside object (e.g., a roadside object that is normally static).

In some embodiments, the system comprises safety hardware and safety software to reduce crash frequency and severity. In some embodiments, the system is configured to provide proactive safety methods, active safety methods, and passive safety methods. In some embodiments, the proactive safety methods are deployed to provide preventive measures before an incident occurs by predicting incidents and estimating risk. In some embodiments, the active safety methods are deployed for imminent incidents before harms occur by rapidly detecting incidents. In some embodiments, the passive safety methods are deployed after an incident occurs to eliminate and/or minimize harms and losses.

In some embodiments, the system is configured to transmit local knowledge, information, and data from an RSU to other RSUs and/or traffic control units (TCUs) to improve performance and efficiency of an IRIS. In some embodiments, the information and data comprises local hardware and/or software configuration, learned algorithms, algorithm parameters, raw data, aggregated data, and data patterns. In some embodiments, the system is configured to transfer local knowledge, information, and data of RSUs, TCUs, and/or traffic control centers (TCCs) during hardware upgrades to the IRIS.

In some embodiments, the system is configured to provide intelligence coordination to distribute intelligence among RSUs and connected and automated vehicles to improve system performance and robustness; decentralize system control with self-organized control; and divide labor and distribute tasks. In some embodiments, the intelligence coordination comprises use of swarm intelligence models (see, e.g., Beni, G., Wang, J. (1993). "Swarm Intelligence in Cellular Robotic Systems" Proceed. NATO Advanced Workshop on Robots and Biological Systems, Tuscany, Italy, Jun. 26-30 (1989). pp. 703-712, incorporated herein by reference). In some embodiments, the intelligence coordination is provided by direct interactions and indirect interactions among IRIS components.

In some embodiments, the system further comprises an interface for smart cities applications managed by a city; and/or for third-party systems and applications. In some embodiments, an RSU provides an interface for data transmission to smart cities applications. In some embodiments, smart cities applications provide information to hospitals, police departments, and/or fire stations. In some embodiments, the system is configured for third-party data retrieval and/or transfer.

In some embodiments, the system is configured to collect and share data from multiple sources and/or multiple sensor types and provide data to RSUs. In some embodiments, the system is further configured to transmit learning methods for model localization. In some embodiments, the system trains models with heuristic parameters obtained from a local TCC/TCU to provide an improved model. In some embodiments, the system is configured to train models to provide improved models for a related task. In some embodiments, the system updates a previously trained model with heuristic parameters to provide an updated trained model.

In related embodiments, the technology provides a method for automated vehicle control and traffic operations comprising providing any of the AI systems described herein.

Additional embodiments will be apparent to persons skilled in the relevant art based on the teachings contained herein.

BRIEF DESCRIPTION OF THE DRAWINGS

The patent or application file contains at least one drawing executed in color. Copies of this patent or patent application publication with color drawings will be provided by the Office upon request and payment of the necessary fee.

These and other features, aspects, and advantages of the present technology will become better understood with reference to the following drawings:

In FIG. 2, an RSU sends its location information to a vehicle and/or a vehicle detects the RSU using a sensing module. A vehicle determines and/or calculates its location using on the data received from RSU and/or data provided by the vehicle sensing module.

In FIG. 3, the RSU senses a vehicle in its coverage area and calculates location information for each vehicle (e.g., using vehicle identification tags, other devices, and/or other data). The RSU sends the location information to the vehicle.

Figure 1:
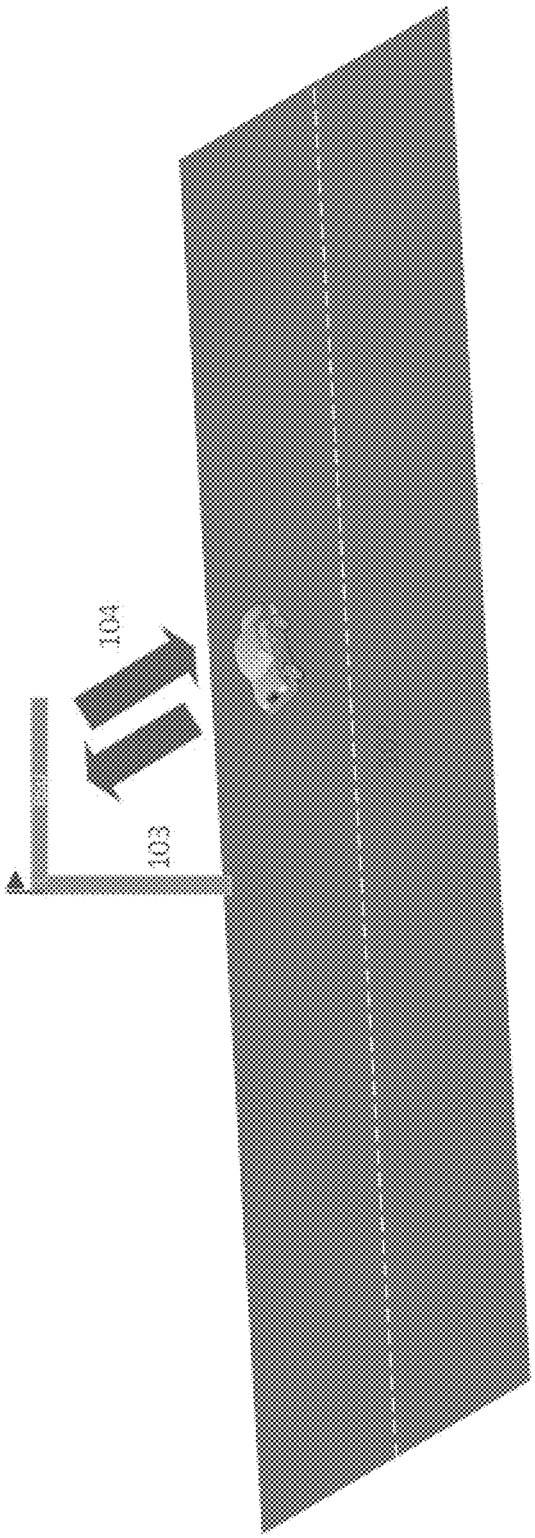
FIG. 1 is a drawing showing the data flow for passive vehicle localization. The embodiment of the technology shown in FIG. 1 comprises an RSU 101, a vehicle 102 (e.g., comprising an OBU), RSU localization information data 103 detected by a vehicle, and RSU location information 104 sent from an RSU to a vehicle. The vehicle 102 detects the location information data 103 of RSU 101 and/or the RSU 101 sends its location information data 104 to the vehicle 102 and the vehicle uses the data for its own location information (e.g., to determine and/or calculate its position).

When a vehicle approaches the roadside reference point, the vehicle sensor detects the reference point (e.g., by the high-lumen LED light and/or the high reflective plates). The vehicle estimates the position and orientation of moving objects on the road (e.g., including the vehicle itself) in real-time using the camera image stream comprising images of anchor points on the road and vehicles on the road. The RFID provides static information to the vehicle, e.g., the pole identifier and road geometry information relative to the reference point (e.g., distance to the lane center and the height from pavement surface). The static information provided by the RFID is also stored in the RSU and transmitted by the RSU to vehicles.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION

Provided herein is technology relating to connected and automated highway systems and particularly, but not exclusively, to systems and methods for providing localized self-evolving artificial intelligence for intelligent road infrastructure systems.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless defined otherwise, all technical and scientific terms used herein have the same meaning as is commonly understood by one of ordinary skill in the art to which the various embodiments described herein belongs. When definitions of terms in incorporated references appear to differ from the definitions provided in the present teachings, the definition provided in the present teachings shall control. The section headings used herein are for organizational purposes only and are not to be construed as limiting the described subject matter in any way.

Definitions

To facilitate an understanding of the present technology, a number of terms and phrases are defined below. Additional definitions are set forth throughout the detailed description.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator and is equivalent to the term "and/or" unless the context clearly dictates otherwise. The term "based on" is not exclusive and allows for being based on additional factors not described, unless the context clearly dictates otherwise. In addition, throughout the specification, the meaning of "a", "an", and "the" include plural references. The meaning of "in" includes "in" and "on."

As used herein, the terms "about", "approximately", "substantially", and "significantly" are understood by persons of ordinary skill in the art and will vary to some extent on the context in which they are used. If there are uses of these terms that are not clear to persons of ordinary skill in the art given the context in which they are used, "about" and "approximately" mean plus or minus less than or equal to 10% of the particular term and "substantially" and "significantly" mean plus or minus greater than 10% of the particular term.

As used herein, disclosure of ranges includes disclosure of all values and further divided ranges within the entire range, including endpoints and sub-ranges given for the ranges.

As used herein, the suffix "-free" refers to an embodiment of the technology that omits the feature of the base root of the word to which "-free" is appended. That is, the term "X-free" as used herein means "without X", where X is a feature of the technology omitted in the "X-free" technology. For example, a "calcium-free" composition does not comprise calcium, a "mixing-free" method does not comprise a mixing step, etc.

Although the terms "first", "second", "third", etc. may be used herein to describe various steps, elements, compositions, components, regions, layers, and/or sections, these steps, elements, compositions, components, regions, layers, and/or sections should not be limited by these terms, unless otherwise indicated. These terms are used to distinguish one step, element, composition, component, region, layer, and/or section from another step, element, composition, component, region, layer, and/or section. Terms such as "first", "second", and other numerical terms when used herein do not imply a sequence or order unless clearly indicated by the context. Thus, a first step, element, composition, component, region, layer, or section discussed herein could be termed a second step, element, composition, component, region, layer, or section without departing from technology.

As used herein, the term "support" when used in reference to one or more components of the CAVH system providing support to and/or supporting one or more other components of the CAVH system refers to, e.g., exchange of information and/or data between components and/or levels of the CAVH system, sending and/or receiving instructions between components and/or levels of the CAVH system, and/or other interaction between components and/or levels of the CAVH system that provide functions such as information exchange, data transfer, messaging, and/or alerting.

As used herein, the term "IRIS system component" refers individually and/or collectively to one or more of an OBU, RSU, TCC, TCU, TCC/TCU, TOC, and/or CAVH cloud component.

As used herein, the term "autonomous vehicle" or "AV" refers to an autonomous vehicle, e.g., at any level of automation (e.g., as defined by SAE International Standard J3016 (2014), incorporated herein by reference).

As used herein, the term "data fusion" refers to integrating a plurality of data sources to provide information (e.g., fused data) that is more consistent, accurate, and useful than any individual data source of the plurality of data sources.

As used herein, the term "background" refers to generally static objects and features of a road, roadside, and road environment that do not change in location and/or that change in location more slowly than vehicles and/or traffic. The "background" is essentially and/or substantially nonchanging with time with respect to the changes of vehicle and traffic locations as a function of time.

As used herein, the term “localized area” refers to an area that is smaller than the total area served by a CAVH system. In some embodiments, a “localized area” refers to a road segment or area of a road for which coverage is provided by a single RSU or by a single RSU and RSUs that are adjacent to the RSU.

As used herein, the term “snow line” refers to a height that is above the historical average snow depth for an area. In some embodiments, the “snow line” is 2-times to 10-times higher (e.g., 2, 3, 4, 5, 6, 7, 8, 9, or 10-times higher) than the historical average snow depth for an area.

As used herein, a “system” refers to a plurality of real and/or abstract components operating together for a common purpose. In some embodiments, a “system” is an integrated assemblage of hardware and/or software components. In some embodiments, each component of the system interacts with one or more other components and/or is related to one or more other components. In some embodiments, a system refers to a combination of components and software for controlling and directing methods.

As used herein, the term “coverage area” refers to an area from which signals are detected and/or data recorded; an area for which services (e.g., communication, data, information, and/or control instructions) are provided. For example, the “coverage area” of an RSU is an area that the RSU sensors monitor and from which area the RSU (e.g., RSU sensors) receive signals describing the area; and/or the “coverage area” of an RSU is an area for which an RSU provides data, information, and/or control instructions (e.g., to vehicles within the coverage area). In some embodiments, the “coverage area” of an RSU refers to the set of locations at which an OBU may communication with said RSU. Coverage areas may overlap; accordingly, a location may be in more than one coverage area. Furthermore, coverage areas may change, e.g., depending on weather, resources, time of day, system demand, RSU deployment, etc.

As used herein, the term “location” refers to a position in space (e.g., three-dimensional space, two-dimensional space, and/or pseudo-two-dimensional space (e.g., an area of the curved surface of the earth that is effectively and/or substantially two-dimensional (e.g., as represented on a two-dimensional map)). In some embodiments, a “location” is described using coordinates relative to the earth or a map (e.g., longitude and latitude). In some embodiments, a “location” is described using coordinates in a coordinate system established by a CAVH system.

DESCRIPTION

In some embodiments, the technology provided herein relates to AI-based systems and methods for managing automated vehicles and traffic. In some embodiments, the AI-based systems and methods are embedded in one or more RSUs. In some embodiments, the one or more RSUs provide sensing and/or communications for an IRIS that facilitates automated vehicle operations and control for connected automated vehicle highway (CAVH) systems. In some embodiments, the systems and methods comprise technologies for localizing objects (e.g., hazards, animals, pedestrians, static objects, etc.) and/or vehicles (e.g., cars, trucks, bicycles, buses, etc.) with increased precision and accuracy. In some embodiments, the systems and methods provide detection of objects and/or vehicles on a road. In some embodiments, the systems and methods provide detection of objects and/or vehicles on a roadside. In some embodiments, the systems and methods provide technologies for behavior detection and prediction, traffic information collection and prediction, and for proactive and reactive safety measures.

In some embodiments, the technology relates to improving the local knowledge (e.g., database) and/or local intelligence of CAVH systems, e.g., to improve locating and/or detecting vehicles, animals, and other objects on a road and/or on a roadside. In some embodiments, a vehicle determines its location by requesting and/or receiving location information from an RSU. In some embodiments, the location of an RSU is accurately measured and stored within the RSU and is transmitted to a vehicle within the coverage area of the RSU. In some embodiments, an RSU detects the location of a vehicle within its coverage area, determines the location of the vehicle, and transmits the location of the vehicle to the vehicle.

As shown in FIG. 1, embodiments of the systems provided herein comprise data flows to locate vehicles as described herein (e.g., by passive and/or active vehicle localization).

Figure 2:
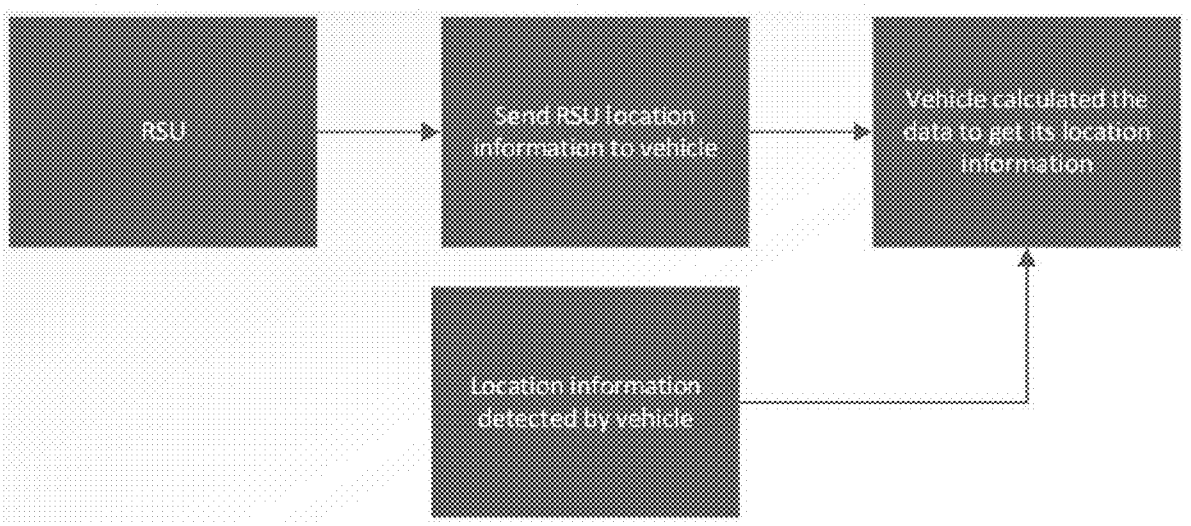
FIG. 2 is a flowchart showing embodiments of a passive sensing approach for providing and/or transmitting information to assist with vehicle localization.

In embodiments related to passive vehicle localization, e.g., as shown in FIG. 2, a vehicle detects (e.g., by an onboard sensor and/or OBU that communicates with an RSU) that it is within the coverage area of an RSU. The RSU comprises a storage component comprising accurate and precise location information describing the location of the RSU and/or the adjoining road. In some embodiments, the RSU broadcasts the location information (e.g., without any specific request for said location information) and in some embodiments the RSU transmits the location information in response to a request for location information (e.g., from a vehicle and/or OBU). The vehicle (e.g., by an OBU) receives the location information and determines its location using the location information. In some embodiments, the vehicle also uses data provided by its own sensors and/or satellite navigation data received by the vehicle (e.g., by an OBU) to determine its location. Accordingly, in passive vehicle localization, location information, sensor information, satellite navigation information, etc. is received, processed, and analyzed by the vehicle and the vehicle determines its own location.

Figure 3:
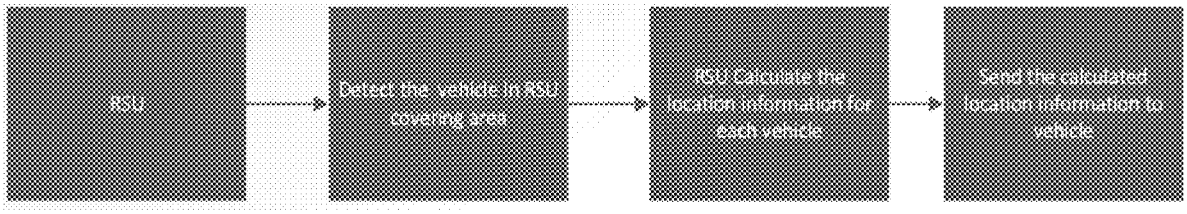
FIG. 3 is a flowchart showing embodiments of an active sensing approach for providing and/or transmitting information to assist with vehicle localization.
Figure 4:
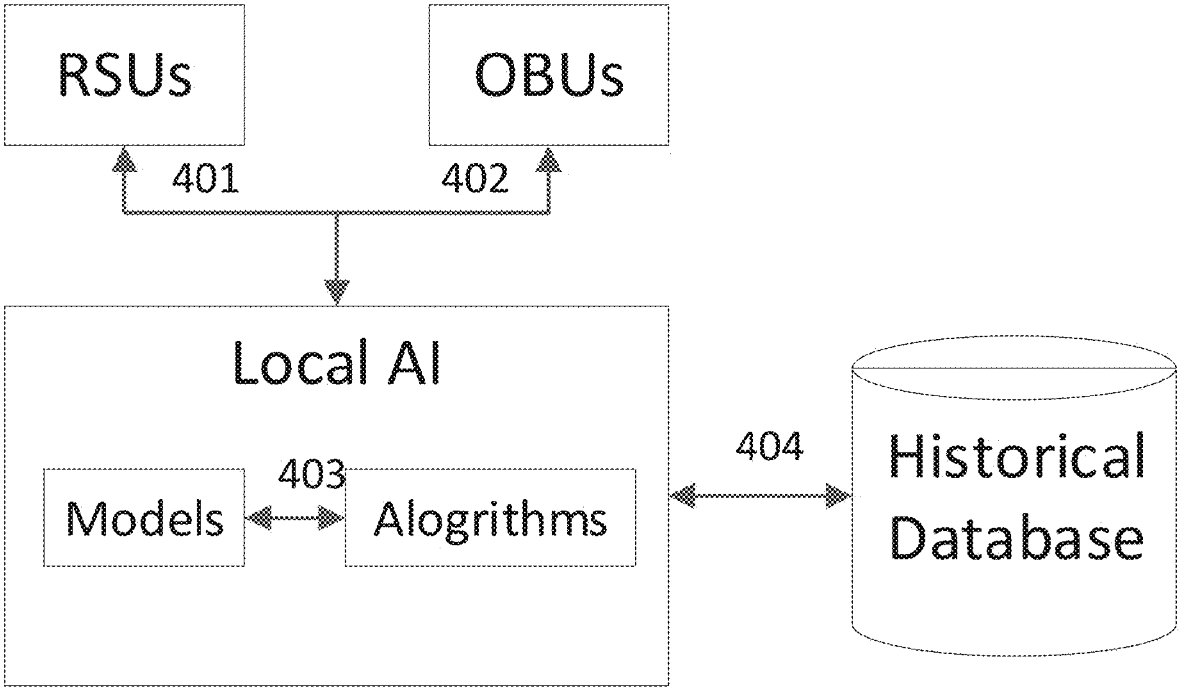
FIG. 4 is a drawing showing data flow for road and environment data collection and for computer learning technologies. The embodiment of the technology shown in FIG. 4 comprises data flow 401 between RSUs and local AI, data flow 402 between OBUs and local AI, interaction 403 between local AI models and algorithms, and/or data flow 404 between local AI and a historical database. The RSUs and OBUs send collected sensing data 401 (e.g., comprising and/or characterizing road conditions, traffic conditions, weather, vehicle locations, vehicle velocities, pedestrian locations, etc.) to the local AI for processing. The local AI fuses the sensing data and uses the data to train models and algorithms. The data is stored in a historical database 404 and the system retrieves the data when needed for analysis and comparison.
Figure 5:
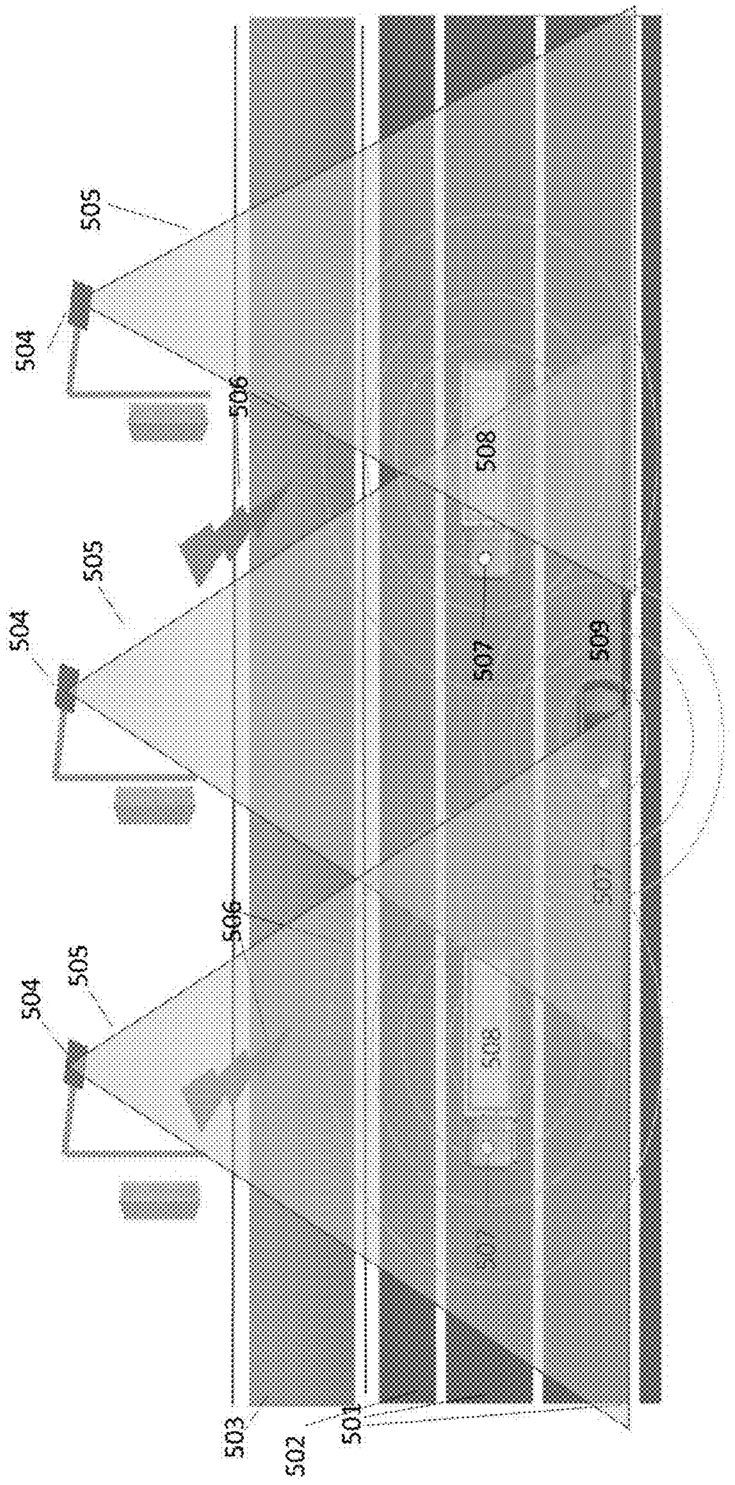
FIG. 5 is a drawing showing an exemplary embodiment of a design for object detection on a road and/or roadside. The embodiment of the technology shown in FIG. 5 comprises motor lanes 501, non-motor lanes 502, roadside lanes 503, RSU 504, the detection range of the RSU 505, communication 506, OBU 517, truck 508, and car 509. The RSU 504 comprises a historical database configured to store information characterizing various objects. RSU sensors (e.g., cameras, LIDAR, RADAR, etc.) in the RSU 504 collect data from the highway and object conditions in the RSU range 505 and receive transmitted data from other RSUs, vehicle OBUs, navigation satellites, weather information, etc. In some embodiments, the RSU sensors provide data describing objects (e.g., trucks (e.g., truck 508), cars (e.g., car 509), and other objects) on the motor lanes 501, non-motor lanes 502, and/or on roadside lanes 503. The OBU 507 in vehicles store the specific data. OBUs 507 send real-time data to one or more RSU (e.g., to the closest RSU (e.g., RSU 504)). The computing module in the RSU 504 performs heterogeneous data fusion to compare the stored data with the historical database to detect road and roadside objects accurately.
Figure 6:
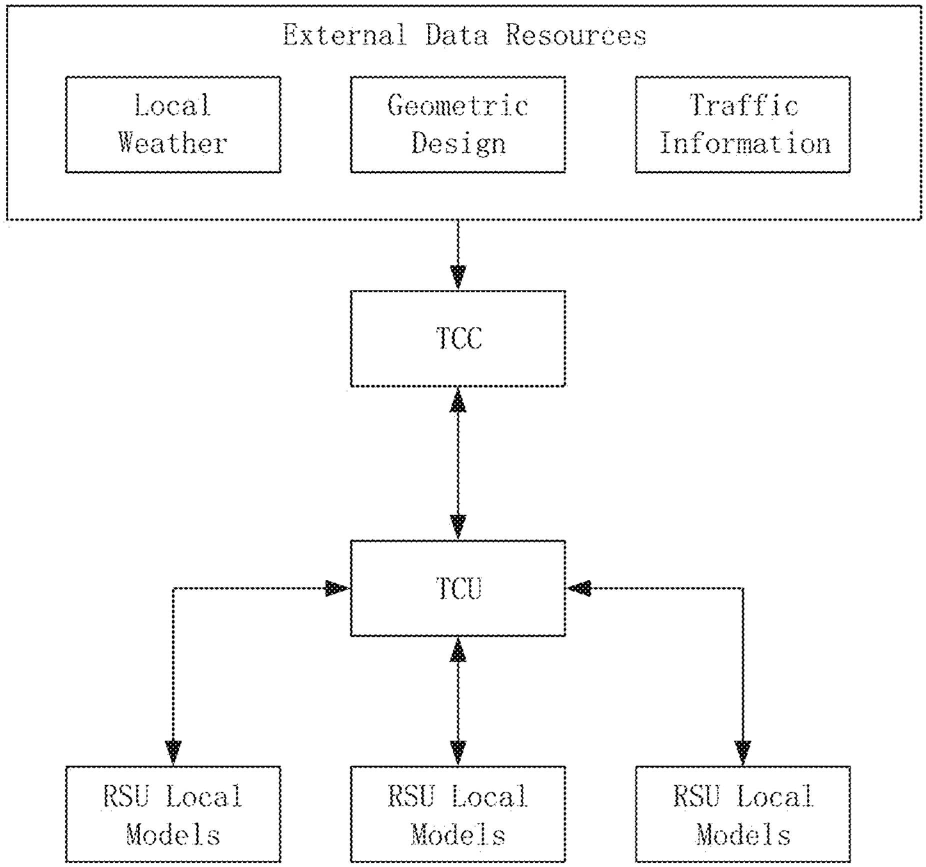
FIG. 6 is a drawing showing data flow from external data resources (e.g., weather information, geometric design and layout of roads in the system, traffic information) to a TCC and among the TCC, TCU, and RSUs. The RSUs comprise AI providing local models of vehicles and other objects on the road and roadside. In some embodiments, weather information comprises real-time (e.g., sensed) weather data, heuristic local weather data. In some embodiments, data of the data flow comprises information on the numbers and types of vehicles; the design of the roads, intersections, on-ramps, off-ramps, merge lanes, curve radius, road width, etc.; and real-time and heuristic traffic data from a TCC.

In embodiments related to active vehicle localization, e.g., as shown in FIG. 3, an RSU detects (e.g., using RSU sensors (e.g., image sensors, RADAR, LIDAR, etc.)) that a vehicle is within the coverage area of the RSU. In some embodiments, an RSU detects that a vehicle is within the coverage area of the RSU by communicating with the vehicle (e.g., by sending and/or receiving data between the RSU and an OBU of the vehicle). In some embodiments, the vehicle comprises a component that identifies the vehicle, e.g., a tag (e.g., an RFID tag), marking, design, etc. to the RSU and/or to the CAVH system. In some embodiments, the RSU comprises a storage component comprising accurate and precise location information describing the location of the RSU and/or the adjoining road. In some embodiments, the RSU receives sensor data from the vehicle, satellite navigation data from the vehicle, and/or other data from the vehicle. The RSU processes and/or analyzes data received from the vehicle and/or location data from the RSU storage component comprising precise and accurate location information describing the location of the RSU, determines the location of the vehicle, and sends the vehicle location to the vehicle. Accordingly, in active vehicle localization, location information, sensor information, satellite navigation information, etc. is received, processed, and analyzed by the RSU, the RSU determines the vehicle location, and the RSU sends the vehicle information to the vehicle.

Figure 7:
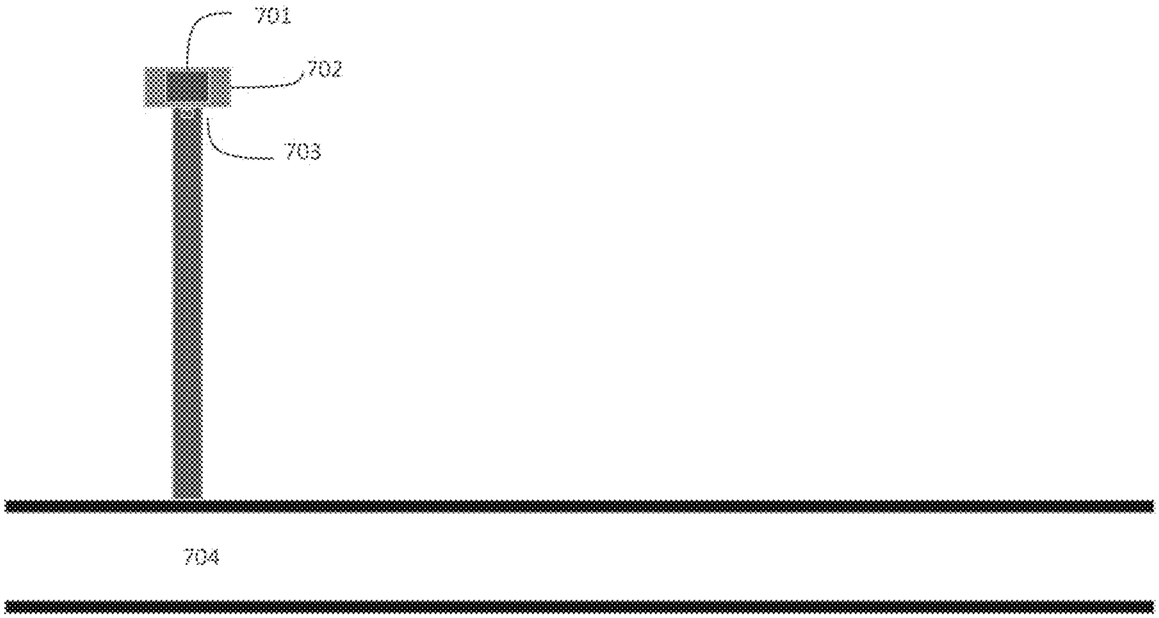
FIG. 7 is a drawing in elevation view showing an embodiment of a roadside reference point (e.g., on a pole). The embodiment of the technology shown in FIG. 7 comprises a high-lumen LED light 701, a highly reflective plate 702, an RFID 703, and a road lane 704 adjacent to the roadside. The pole has a height that is above the snow line in winter so that the LED light 701 and reflective plates 702 are visible in high snow accumulation conditions. The relative position of the center point of the LED light 701 and reflective plate 702 with respect to the local road segment (e.g., height of the LED light 701 and reflective plate 702 from the pavement, distance from the pole base to the center line of the each lane, etc.) is premeasured and stored in the RSU and the RFID on the pole.

In some embodiments, the systems described herein comprise roadside reference points (see, e.g., FIG. 7). In some embodiments, the roadside reference points are reflective poles. In some embodiments, the roadside reference points comprise a light or other beacon. In some embodiments, the roadside reference points comprise an RSU. In some embodiments, the roadside reference point comprises an RFID. In some embodiments, the roadside reference points are reflective to electromagnetic radiation (e.g., radio waves, light, non-visible light, microwaves, etc.) In some embodiments, the roadside reference points comprise a storage component comprising precise and accurate location information for the roadside reference points. In some embodiments, the position of the center point of the roadside reference point with respect to the local road segment is premeasured and stored in the RSU and/or in an RFID on the roadside reference point. In some embodiments, the height of the center point of the roadside reference point from the pavement is premeasured and stored in the RSU and/or in an RFID on the roadside reference point. In some embodiments, the distance from the pole base to the center line of a lane in a road is premeasured and stored in the RSU and/or in an RFID on the roadside reference point. In some embodiments, the roadside reference points broadcast their location. In some embodiments, the roadside reference points have a height that is above the snow line, e.g., so that reflective components (e.g., reflective plates) and/or lights (e.g., an LED light) are visible in high snow accumulation conditions. In some embodiments, a signal transmitted by a vehicle reflects off a roadside reference point (e.g., a reflective pole) and the reflected signal is received by the vehicle. In some embodiments, the reflected signal is used by the vehicle to determine the location of the roadside reference point and/or of the vehicle.

In some embodiments, when a vehicle approaches the roadside reference point, a vehicle sensor detects the reference point (e.g., by an LED light, reflective plates, or other beacons). The vehicle estimates its position and orientation in real-time using an image stream (e.g., recorded by a camera on the vehicle) comprising images of the anchor points as a function of time. In some embodiments, the RSU and/or RFID provides static information to the vehicle (e.g., a roadside reference point identifier and the road geometry information relative to the reference point (e.g., distance to the lane center and the height from pavement surface)). In some embodiments, the static information provided by the RFID is also stored in the RSU and is transmitted by the RSU to vehicles (e.g., to an OBU on a vehicle).

Some embodiments relate to machine learning to develop and train models for identifying and/or detecting vehicles, animals, and other objects on a road and/or on a roadside. For instance, as shown in FIG. 2, embodiments of the technology comprise data flows for collecting data describing a road, roadside, and/or environment. In some embodiments, embodiments of the technology use the collected data to update and/or train a model for identifying and/or detecting vehicles, animals, and other objects on a road and/or on a roadside. In some embodiments, RSUs and/or OBUs comprise sensors that collected sensing data, e.g., describing road conditions, traffic conditions, weather, object locations, pedestrian locations and movements, vehicle locations and movements (e.g., velocities and/or accelerations), etc. In some embodiments, these data are fused and/or provided to the local AI systems to update and/or train models and/or algorithms for identifying and/or detecting vehicles, animals, and other objects on a road and/or on a roadside. Further, in some embodiments, these data are stored in a historical database for analysis. In some embodiments, these data are compared with historical sensing data, e.g., describing road conditions, traffic conditions, weather, object locations, pedestrian locations and movements, vehicle locations and movements (e.g., velocities and/or accelerations), etc., that were stored previously in the historical database and provided by the historical database.

In some embodiments, the system comprises a historical database comprising compiled sensing data, weather data, and other data, e.g., describing road conditions, traffic conditions, weather, object locations, pedestrian locations and movements, vehicle locations and movements (e.g., velocities and/or accelerations), etc. In some embodiments, data (e.g., real-time data) collected from one or more RSUs (e.g., sensed by RSU sensors (e.g., a camera (e.g., image data), RADAR, LIDAR))) and/or satellite navigation information and/or data is compiled and stored in the historical database. In some embodiments, the data collected by an RSU and stored in the historical database describes vehicles, animals, and other objects on a road (e.g., on lanes for motorized vehicles and/or on lanes for non-motorized vehicles); vehicles, animals, and other objects on a roadside; and/or road conditions, traffic conditions, weather, and/or other information describing the environment. In some embodiments, the data collected by an RSU describes vehicles, animals, and other objects within the coverage area of the RSU. In some embodiments, data (e.g., real-time data) collected by a vehicle (e.g., by an OBU) are transmitted to an RSU (e.g., the closest RSU) and are stored in the historical database. In some embodiments, data (e.g., real-time data) collected by a vehicle comprise sensing data, weather data, and other data, e.g., describing road conditions, traffic conditions, weather, object locations, pedestrian locations and movements, vehicle locations and movements (e.g., velocities and/or accelerations), etc. In some embodiments, an RSU performs heterogenous data fusion on collected data to compare real-time data with historical data provided by the historical database, thus improving the accuracy of detecting vehicles, animals, and other objects on a road (e.g., on lanes for motorized vehicles and/or on lanes for non-motorized vehicles); and/or vehicles, animals, and other objects on a roadside.

In some embodiments, the technology provides methods of local data sharing. For example, in some embodiments, data collected from a plurality of sources is shared among IRIS components, e.g., and provided to an RSU. In some embodiments, the data provided to the RSU is specific for the location of the RSU (e.g., the data provided to the RSU is specific for the coverage area of the RSU). For example, in some embodiments, information and/or data describing, e.g., weather conditions, geometric design and/or layout of roads, traffic data, distribution of vehicle types, etc. is shared and/or transmitted among IRIS components and the information and/or data specific for the coverage area of an RSU is sent to said RSU. Accordingly, embodiments provide providing data to an RSU describing the weather conditions, geometric design and/or layout of roads, traffic data, distribution of vehicle types, etc. within the coverage area of the RSU. In some embodiments, the technology comprises providing data to an RSU describing the weather conditions, geometric design and/or layout of roads, traffic data, distribution of vehicle types, etc. within the coverage areas of RSUs adjacent to the RSU.

In some embodiments, the technology comprises use of computer perception technologies, e.g., using data provided by sensors (e.g., cameras (e.g., cameras detecting and/or recording electromagnetic radiation in the visible spectrum and/or non-visible spectra), microphones, wireless signals, RADAR, and/or LIDAR) to detect objects and/or describe the environment. In some embodiments, the technology provided herein comprises the use of computer vision to analyze sensor data (e.g., image data).

In some embodiments, the technology provides a vehicle operations and control system comprising one or more of a roadside unit (RSU) network; a Traffic Control Unit (TCU) and Traffic Control Center (TCC) network (e.g., TCU/TCC network); a vehicle comprising an onboard unit (OBU); and/or a Traffic Operations Center (TOC). Embodiments provide an RSU network comprising one or more RSUs. In some embodiments, RSUs have a variety of functionalities. For example, embodiments of RSUs comprise one or more components, sensors, and/or modules as described herein in relation to the RSU. For example, in some embodiments RSUs provide real-time vehicle environment sensing and traffic behavior prediction and send instantaneous control instructions for individual vehicles through OBUs.

In some embodiments, the technology provides a system (e.g., a vehicle operations and control system comprising one or more of an RSU network; a TCU/TCC network; a vehicle comprising an onboard unit OBU; a TOC; and a cloud-based platform configured to provide information and computing services; see, e.g., U.S. Provisional Patent Application Ser. No. 62/691,391, incorporated herein by reference in its entirety) configured to provide sensing functions, transportation behavior prediction and management functions, planning and decision making functions, and/or vehicle control functions. In some embodiments, the system comprises wired and/or wireless communications media. In some embodiments, the system comprises a power supply network. In some embodiments, the system comprises a cyber-safety and security system. In some embodiments, the system comprises a real-time communication function.

In some embodiments, the RSU network comprises an RSU and/or an RSU subsystem. In some embodiments, an RSU comprises one or more of: a sensing module configured to measure characteristics of the driving environment; a communication module configured to communicate with vehicles, TCUs, and the cloud; a data processing module configured to process, fuse, and compute data from the sensing and/or communication modules; an interface module configured to communicate between the data processing module and the communication module; and an adaptive power supply module configured to provide power and to adjust power according to the conditions of the local power grid. In some embodiments, the adaptive power supply module is configured to provide backup redundancy. In some embodiments, a communication module communicates using wired or wireless media. See, e.g., U.S. patent application Ser. No. 16/135,916, incorporated herein by reference.

In some embodiments, the technology provides a vehicle operations and control system comprising one or more of a roadside unit (RSU) network; a Traffic Control Unit (TCU) and Traffic Control Center (TCC) network (e.g., TCU/TCC network); a vehicle comprising an onboard unit (OBU); and/or a Traffic Operations Center (TOC).

Embodiments provide an RSU network comprising one or more RSUs. In some embodiments, RSUs have a variety of functionalities. For example, embodiments of RSUs comprise one or more components, sensors, and/or modules as described herein in relation to the RSU. For example, in some embodiments RSUs provide real-time vehicle environment sensing and traffic behavior prediction and send instantaneous control instructions for individual vehicles through OBUs.

In some embodiments, the technology provides a system (e.g., a vehicle operations and control system comprising one or more of an RSU network; a TCU/TCC network; a vehicle comprising an onboard unit OBU; a TOC; and a cloud-based platform configured to provide information and computing services; see, e.g., U.S. Provisional Patent Application Ser. No. 62/691,391, incorporated herein by reference in its entirety) configured to provide sensing functions, transportation behavior prediction and management functions, planning and decision making functions, and/or vehicle control functions. In some embodiments, the system comprises wired and/or wireless communications media. In some embodiments, the system comprises a power supply network. In some embodiments, the system comprises a cyber-safety and security system. In some embodiments, the system comprises a real-time communication function.

In some embodiments, the RSU network comprises an RSU and/or an RSU subsystem. In some embodiments, an RSU comprises one or more of: a sensing module configured to measure characteristics of the driving environment; a communication module configured to communicate with vehicles, TCUs, and the cloud; a data processing module configured to process, fuse, and compute data from the sensing and/or communication modules; an interface module configured to communicate between the data processing module and the communication module; and an adaptive power supply module configured to provide power and to adjust power according to the conditions of the local power grid. In some embodiments, the adaptive power supply module is configured to provide backup redundancy. In some embodiments, a communication module communicates using wired or wireless media. See, e.g., U.S. patent application Ser. No. 16/135,916, incorporated herein by reference.

In some embodiments, the technology provides a system (e.g., a vehicle operations and control system comprising a RSU network; a TCU/TCC network; a vehicle comprising an onboard unit OBU; a TOC; and a cloud-based platform configured to provide information and computing services) configured to provide sensing functions, transportation behavior prediction and management functions, planning and decision making functions, and/or vehicle control functions. In some embodiments, the system comprises wired and/or wireless communications media. In some embodiments, the system comprises a power supply network. In some embodiments, the system comprises a cyber-safety and security system. In some embodiments, the system comprises a real-time communication function.

In some embodiments, the RSU network of embodiments of the systems provided herein comprises an RSU subsystem. In some embodiments, the RSU subsystem comprises: a sensing module configured to measure characteristics of the driving environment; a communication module configured to communicate with vehicles, TCUs, and the cloud; a data processing module configured to process, fuse, and compute data from the sensing and/or communication modules; an interface module configured to communicate between the data processing module and the communication module; and an adaptive power supply module configured to provide power and to adjust power according to the conditions of the local power grid. In some embodiments, the adaptive power supply module is configured to provide backup redundancy. In some embodiments, communication module communicates using wired or wireless media.

In some embodiments, the sensing module comprises a radar based sensor. In some embodiments, the sensing module comprises a vision based sensor. In some embodiments, the sensing module comprises a radar based sensor and a vision based sensor and wherein said vision based sensor and said radar based sensor are configured to sense the driving environment and vehicle attribute data. In some embodiments, the radar based sensor is a LIDAR, microwave radar, ultrasonic radar, or millimeter radar. In some embodiments, the vision based sensor is a camera, infrared camera, or thermal camera. In some embodiments, the camera is a color camera.

In some embodiments, the sensing module comprises a satellite based navigation system. In some embodiments, the sensing module comprises an inertial navigation system. In some embodiments, the sensing module comprises a satellite based navigation system and an inertial navigation system and said sensing module (e.g., comprising a satellite based navigation system and an inertial navigation system) is configured to provide vehicle location data. In some embodiments, the satellite based navigation system is a Differential Global Positioning Systems (DGPS) or a BeiDou Navigation Satellite System (BDS) System or a GLONASS Global Navigation Satellite System. In some embodiments, the inertial navigation system comprises an inertial reference unit.

In some embodiments, the sensing module of embodiments of the systems described herein comprises a vehicle identification device. In some embodiments, the vehicle identification device comprises RFID, Bluetooth, Wi-fi (IEEE 802.11), or a cellular network radio, e.g., a 4G or 5G cellular network radio.

In some embodiments, the RSU sub-system is deployed at a fixed location near road infrastructure. In some embodiments, the RSU sub-system is deployed near a highway roadside, a highway on-ramp, a highway off-ramp, an interchange, a bridge, a tunnel, a toll station, or on a drone over a critical location. In some embodiments, the RSU sub-system is deployed on a mobile component. In some embodiments, the RSU sub-system is deployed on a vehicle drone over a critical location, on an unmanned aerial vehicle (UAV), at a site of traffic congestion, at a site of a traffic accident, at a site of highway construction, at a site of extreme weather. In some embodiments, an RSU sub-system is positioned according to road geometry, heavy vehicle size, heavy vehicle dynamics, heavy vehicle density, and/or heavy vehicle blind zones. In some embodiments, the RSU sub-system is installed on a gantry (e.g., an overhead assembly, e.g., on which highway signs or signals are mounted). In some embodiments, the RSU sub-system is installed using a single cantilever or dual cantilever support.

In some embodiments, the TCC network of embodiments of the systems described herein is configured to provide traffic operation optimization, data processing and archiving. In some embodiments, the TCC network comprises a human operations interface. In some embodiments, the TCC network is a macroscopic TCC, a regional TCC, or a corridor TCC based on the geographical area covered by the TCC network. See, e.g., U.S. patent application Ser. No. 15/628,331, filed Jun. 20, 2017 and U.S. Provisional Patent Application Ser. Nos. 62/626,862, filed Feb. 6, 2018, 62/627,005, filed Feb. 6, 2018, 62/655,651, filed Apr. 10, 2018, and 62/669,215, filed May 9, 2018, each of which is incorporated herein in its entirety for all purposes.

In some embodiments, the TCU network is configured to provide real-time vehicle control and data processing. In some embodiments, real-time vehicle control and data processing are automated based on preinstalled algorithms.

In some embodiments, the TCU network is a segment TCU or a point TCUs based on the geographical area covered by the TCU network. See, e.g., U.S. patent application Ser. No. 15/628,331, filed Jun. 20, 2017 and U.S. Provisional Patent Application Ser. Nos. 62/626,862, filed Feb. 6, 2018, 62/627,005, filed Feb. 6, 2018, 62/655,651, filed Apr. 10, 2018, and 62/669,215, filed May 9, 2018, each of which is incorporated herein in its entirety for all purposes. In some embodiments, the system comprises a point TCU physically combined or integrated with an RSU. In some embodiments, the system comprises a segment TCU physically combined or integrated with an RSU.

In some embodiments, the TCC network of embodiments of the systems described herein comprises macroscopic TCCs configured to process information from regional TCCs and provide control targets to regional TCCs; regional TCCs configured to process information from corridor TCCs and provide control targets to corridor TCCs; and corridor TCCs configured to process information from macroscopic and segment TCUs and provide control targets to segment TCUs. See, e.g., U.S. patent application Ser. No. 15/628,331, filed Jun. 20, 2017 and U.S. Provisional Patent Application Ser. Nos. 62/626,862, filed Feb. 6, 2018, 62/627,005, filed Feb. 6, 2018, 62/655,651, filed Apr. 10, 2018, and 62/669,215, filed May 9, 2018, each of which is incorporated herein in its entirety for all purposes.

In some embodiments, the TCU network comprises: segment TCUs configured to process information from corridor and/or point TOCs and provide control targets to point TCUs, and point TCUs configured to process information from the segment TCU and RSUs and provide vehicle-based control instructions to an RSU. See, e.g., U.S. patent application Ser. No. 15/628,331, filed Jun. 20, 2017 and U.S. Provisional Patent Application Ser. Nos. 62/626,862, filed Feb. 6, 2018, 62/627,005, filed Feb. 6, 2018, 62/655,651, filed Apr. 10, 2018, and 62/669,215, filed May 9, 2018, each of which is incorporated herein in its entirety for all purposes.

In some embodiments, the RSU network of embodiments of the systems provided herein provides vehicles with customized traffic information and control instructions and receives information provided by vehicles.

In some embodiments, the TCC network of embodiments of the systems provided herein comprises one or more TCCs comprising a connection and data exchange module configured to provide data connection and exchange between TCCs. In some embodiments, the connection and data exchange module comprises a software component providing data rectify, data format convert, firewall, encryption, and decryption methods. In some embodiments, the TCC network comprises one or more TCCs comprising a transmission and network module configured to provide communication methods for data exchange between TCCs. In some embodiments, the transmission and network module comprises a software component providing an access function and data conversion between different transmission networks within the cloud platform. In some embodiments, the TCC network comprises one or more TCCs comprising a service management module configured to provide data storage, data searching, data analysis, information security, privacy protection, and network management functions. In some embodiments, the TCC network comprises one or more TCCs comprising an application module configured to provide management and control of the TCC network. In some embodiments, the application module is configured to manage cooperative control of vehicles and roads, system monitoring, emergency services, and human and device interaction.

In some embodiments, embodiments of the TCU network of the systems described herein comprises one or more TCUs comprising a sensor and control module configured to provide the sensing and control functions of an RSU. In some embodiments, the sensor and control module is configured to provide the sensing and control functions of radar, camera, RFID, and/or V2I (vehicle-to-infrastructure) equipment. In some embodiments, the sensor and control module comprises a DSRC, GPS, 4G, 5G, and/or wifi radio. In some embodiments, the TCU network comprises one or more TCUs comprising a transmission and network module configured to provide communication network function for data exchange between an automated heavy vehicle and an RSU. In some embodiments, the TCU network comprises one or more TCUs comprising a service management module configured to provide data storage, data searching, data analysis, information security, privacy protection, and network management. In some embodiments, the TCU network comprises one or more TCUs comprising an application module configured to provide management and control methods of an RSU. In some embodiments, the management and control methods of an RSU comprise local cooperative control of vehicles and roads, system monitoring, and emergency service. In some embodiments, the TCC network comprises one or more TCCs further comprising an application module and said service management module provides data analysis for the application module. In some embodiments, the TCU network comprises one or more TCUs further comprising an application module and said service management module provides data analysis for the application module.

In some embodiments, the TOC of embodiments of the systems described herein comprises interactive interfaces. In some embodiments, the interactive interfaces provide control of said TCC network and data exchange. In some embodiments, the interactive interfaces comprise information sharing interfaces and vehicle control interfaces. In some embodiments, the information sharing interfaces comprise: an interface that shares and obtains traffic data; an interface that shares and obtains traffic incidents; an interface that shares and obtains passenger demand patterns from shared mobility systems; an interface that dynamically adjusts prices according to instructions given by said vehicle operations and control system; and/or an interface that allows a special agency (e.g., a vehicle administrative office or police) to delete, change, and share information. In some embodiments, the vehicle control interfaces of embodiments of the interactive interfaces comprise: an interface that allows said vehicle operations and control system to assume control of vehicles; an interface that allows vehicles to form a platoon with other vehicles; and/or an interface that allows a special agency (e.g., a vehicle administrative office or police) to assume control of a vehicle. In some embodiments, the traffic data comprises vehicle density, vehicle velocity, and/or vehicle trajectory. In some embodiments, the traffic data is provided by the vehicle operations and control system and/or other share mobility systems. In some embodiments, traffic incidents comprise extreme conditions, major accident, and/or a natural disaster. In some embodiments, an interface allows the vehicle operations and control system to assume control of vehicles upon the occurrence of a traffic event, extreme weather, or pavement breakdown when alerted by said vehicle operations and control system and/or other share mobility systems. In some embodiments, an interface allows vehicles to form a platoon with other vehicles when they are driving in the same dedicated and/or same non-dedicated lane.

In some embodiments, the OBU of embodiments of systems described herein comprises a communication module configured to communicate with an RSU. In some embodiments, the OBU comprises a communication module configured to communicate with another OBU. In some embodiments, the OBU comprises a data collection module configured to collect data from external vehicle sensors and internal vehicle sensors; and to monitor vehicle status and driver status. In some embodiments, the OBU comprises a vehicle control module configured to execute control instructions for driving tasks. In some embodiments, the driving tasks comprise car following and/or lane changing. In some embodiments, the control instructions are received from an RSU. In some embodiments, the OBU is configured to control a vehicle using data received from an RSU. In some embodiments, the data received from said RSU comprises: vehicle control instructions; travel route and traffic information; and/or services information. In some embodiments, the vehicle control instructions comprise a longitudinal acceleration rate, a lateral acceleration rate, and/or a vehicle orientation. In some embodiments, the travel route and traffic information comprise traffic conditions, incident location, intersection location, entrance location, and/or exit location. In some embodiments, the services data comprises the location of a fuel station and/or location of a point of interest. In some embodiments, OBU is configured to send data to an RSU. In some embodiments, the data sent to said RSU comprises: driver input data; driver condition data; vehicle condition data; and/or goods condition data. In some embodiments, the driver input data comprises the origin of the trip, the destination of the trip, expected travel time, service requests, and/or level of hazardous material. In some embodiments, the driver condition data comprises driver behaviors, fatigue level, and/or driver distractions. In some embodiments, the vehicle condition data comprises vehicle ID, vehicle type, and/or data collected by a data collection module. In some embodiments, the goods condition data comprises the material type and/or the material size.

In some embodiments, the OBU of embodiments of systems described herein is configured to collecting data comprising: vehicle engine status; vehicle speed; goods status; surrounding objects detected by vehicles; and/or driver conditions. In some embodiments, the OBU is configured to assume control of a vehicle. In some embodiments, the OBU is configured to assume control of a vehicle when the automated driving system fails. In some embodiments, the OBU is configured to assume control of a vehicle when the vehicle condition and/or traffic condition prevents the automated driving system from driving said vehicle. In some embodiments, the vehicle condition and/or traffic condition is adverse weather conditions, a traffic incident, a system failure, and/or a communication failure.

In some embodiments, the cloud platform of embodiments of systems described herein is configured to support automated vehicle application services. In some embodiments, the cloud platform is configured according to cloud platform architecture and data exchange standards. In some embodiments, the cloud platform is configured according to a cloud operating system. In some embodiments, the cloud platform is configured to provide data storage and retrieval technology, big data association analysis, deep mining technologies, and data security. In some embodiments, the cloud platform is configured to provide data security systems providing data storage security, transmission security, and/or application security. In some embodiments, the cloud platform is configured to provide the said RSU network, said TCU network, and/or said TCC network with information and computing services comprising: Storage as a service (STaaS) functions to provide expandable storage; Control as a service (CCaaS) functions to provide expandable control capability; Computing as a service (CaaS) functions to provide expandable computing resources; and/or Sensing as a service (SEaaS) functions to provide expandable sensing capability. In some embodiments, the cloud platform is configured to implement a traffic state estimation and prediction algorithm comprising: weighted data fusion to estimate traffic states, wherein data provided by the RSU network, Traffic Control Unit (TCU) and Traffic Control Center (TCC) network, and TOC network are fused according to weights determined by the quality of information provided by the RSU network, Traffic Control Unit (TCU) and Traffic Control Center (TCC) network, and TOC network; and estimated traffic states based on historical and present RSU network, Traffic Control Unit (TCU) and Traffic Control Center (TCC) network, and TOC network data.

Also provided herein are methods employing any of the systems described herein for the management of one or more aspects of traffic control. The methods include those processes undertaken by individual participants in the system (e.g., drivers, public or private local, regional, or national transportation facilitators, government agencies, etc.) as well as collective activities of one or more participants working in coordination or independently from each other.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Certain steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Although the disclosure herein refers to certain illustrated embodiments, it is to be understood that these embodiments are presented by way of example and not by way of limitation.

All publications and patents mentioned in the above specification are herein incorporated by reference in their entirety for all purposes. Various modifications and variations of the described compositions, methods, and uses of the technology will be apparent to those skilled in the art without departing from the scope and spirit of the technology as described. Although the technology has been described in connection with specific exemplary embodiments, it should be understood that the invention as claimed should not be unduly limited to such specific embodiments. Indeed, various modifications of the described modes for carrying out the invention that are obvious to those skilled in the art are intended to be within the scope of the following claims.

We claim:

1. A roadside unit (RSU) network comprising one or more RSU, wherein said one or more RSU comprises:

1) an artificial intelligence (AI) system for automated vehicle control and traffic operations, wherein said AI system comprises:

a) a database of accumulated historical data comprising background, vehicle, traffic, object, and/or environmental data for a localized area;

b) sensors configured to provide real-time data comprising background, vehicle, traffic, object, and/or environmental data for said localized area; and c) a computation component configured to compare said real-time data and said accumulated historical data to provide sensing, behavior prediction and management, decision making, and vehicle control for an intelligent road infrastructure system (IRIS);

wherein the AI system is configured to provide proactive safety methods by predicting incidents and estimating risk; and 2) a data processing module configured to fuse data from data sources comprising vehicle sensors and roadside sensors.

2. The RSU network of claim 1, wherein said computation component is configured to implement a self-evolving algorithm.

3. The RSU network of claim 1, wherein said localized area comprises a coverage area served by a roadside unit (RSU).

4. The RSU network of claim 1, wherein said AI system comprises an interface for communicating with a plurality of other IRIS components, smart cities, and/or other smart infrastructure.

5. The RSU network of claim 1, wherein said AI system is configured to determine a vehicle location.

6. The RSU network of claim 1, wherein said AI system determines a vehicle location using a plurality of reference points.

7. The RSU network of claim 1, wherein said AI system determines a vehicle location using a plurality of reflective fixed structures.

8. The RSU network of claim 1, wherein said AI system further comprises a component to provide a plurality of map services.

9. The RSU network of claim 1, wherein said AI system is further configured to identify a plurality of high-risk locations, wherein a high-risk location is a location comprising an animal, a pedestrian, a traffic accident, unsafe pavement, and/or adverse weather.

10. The RSU network of claim 1, wherein said AI system is configured to sense an environment and road in real time to acquire environmental and/or road data.

11. The RSU network of claim 1, wherein said AI system is configured to predict a plurality of road and environmental conditions using said database of accumulated historical data and said real-time data, wherein said real-time data is provided by one or more sensors of said RSU network and/or by one or more vehicle sensors.

12. The RSU network of claim 1, wherein said AI system is configured to detect objects on a road.

13. The RSU network of claim 1, wherein said AI system is configured to detect objects on a roadside.

14. The RSU network of claim 1, wherein said AI system is configured to predict object behavior.

15. The RSU network of claim 1, wherein said AI system further comprises safety hardware and safety software to reduce a crash frequency and a crash severity.

16. The RSU network of claim 1, wherein said AI system is configured to transmit local knowledge, information, and data from an RSU to other RSUs and/or traffic control units (TCUs) to improve performance and efficiency of an IRIS.

17. The RSU network of claim 1, wherein said AI system is configured to transfer local knowledge, information, and data of a plurality of RSUs, TCUs, and/or traffic control centers (TCCs) during hardware upgrades to the IRIS.

18. The RSU network of claim 1, wherein said AI system is configured to provide intelligence coordination to:

a) distribute intelligence among a plurality of RSUs and connected and automated vehicles to improve performance and robustness of automated vehicle control and traffic operations;

b) decentralize system control with self-organized control; and c) divide labor and distribute tasks.

19. The RSU network of claim 1, wherein said AI system further comprises an interface for a) a plurality of smart cities applications managed by a city; and/or b) a plurality of third-party systems and applications.

20. The RSU network of claim 1, wherein said AI system is configured to collect and share data from a plurality of multiple sources and provide data to RSUs.

* * * * *